United States Patent
Patrick et al.

(10) Patent No.: US 10,576,481 B2
(45) Date of Patent: Mar. 3, 2020

(54) METHOD OF INTEGRATED FLOW CONTROL FOR THE SPRINKLER ACTIVATED GENERATOR

(71) Applicant: JAIN IRRIGATION SYSTEMS LIMITED

(72) Inventors: Defrank Michael Patrick, Pawhuska, OK (US); Jain Ajit Bhavarlal, Jalgaon (IN)

(73) Assignee: JAIN IRRIGATION SYSTEMS LIMITED, Jalgaon (IN)

( * ) Notice: Subject to any disclaimer, the term of this patent is extended or adjusted under 35 U.S.C. 154(b) by 0 days.

(21) Appl. No.: 15/523,992

(22) PCT Filed: Nov. 4, 2015

(86) PCT No.: PCT/IN2015/000406
§ 371 (c)(1),
(2) Date: May 3, 2017

(87) PCT Pub. No.: WO2016/071923
PCT Pub. Date: May 12, 2016

(65) Prior Publication Data
US 2017/0333925 A1   Nov. 23, 2017

(30) Foreign Application Priority Data

Nov. 4, 2014  (IN) .......................... 3478/MUM/2014

(51) Int. Cl.
*B05B 3/04*   (2006.01)
*F02B 3/08*   (2006.01)
*F03B 3/08*   (2006.01)

(52) U.S. Cl.
CPC .............. *B05B 3/0486* (2013.01); *F03B 3/08* (2013.01); *F05B 2220/60* (2013.01)

(58) Field of Classification Search
None
See application file for complete search history.

(56) References Cited

U.S. PATENT DOCUMENTS

| | | | | |
|---|---|---|---|---|
| 4,352,025 A | * | 9/1982 | Troyen | F03B 13/00 290/54 |
| 4,731,545 A | * | 3/1988 | Lerner | H02K 7/1823 290/43 |
| 4,951,915 A | * | 8/1990 | Piao | F16K 1/14 251/129.03 |
| 5,278,749 A | * | 1/1994 | De Man | A01G 25/16 137/624.13 |
| 6,864,591 B2 | * | 3/2005 | DeFrank | B05B 3/006 290/1 R |

(Continued)

FOREIGN PATENT DOCUMENTS

WO    WO-2014068594 A2 *  5/2014  ............. A01G 25/16

*Primary Examiner* — Ramesh B Patel
(74) *Attorney, Agent, or Firm* — Harness, Dickey & Pierce, P.L.C.

(57) ABSTRACT

Disclosed is sprinkler system. The system comprises a gate valve. Further, a sprinkler frame is mounted on the gate valve. The sprinkler frame further consists of wires for connection. The system further comprises a generator. The generator is mechanically coupled with a rotor and a generator base. Further the system comprises of an electronic component. The system is housed in a sprinkler housing.

5 Claims, 3 Drawing Sheets

(56) References Cited

U.S. PATENT DOCUMENTS

| | | | | |
|---|---|---|---|---|
| 7,406,363 B2 * | 7/2008 | Doering | ............... | A01G 25/162 |
| | | | | 700/282 |
| 2008/0284174 A1 * | 11/2008 | Nagler | .................... | F03B 13/00 |
| | | | | 290/54 |
| 2013/0205889 A1 * | 8/2013 | Yu | ....................... | G01M 99/002 |
| | | | | 73/168 |
| 2013/0343911 A1 * | 12/2013 | Stephens | ................. | F04B 49/00 |
| | | | | 417/44.1 |
| 2014/0339326 A1 * | 11/2014 | Salsberg | ............. | A01G 25/167 |
| | | | | 239/63 |

* cited by examiner

METHOD OF INTEGRATED FLOW CONTROL FOR THE SPRINKLER ACTIVATED GENERATOR

CROSS REFERENCE TO RELATED APPLICATIONS

The present application is a National Stage Application claiming the priority of co-pending PCT Application No. PCT/IN2015/000406, filed Nov. 4, 2015, which in turn, claims priority from Indian Application No. 3478/MUM/2014, filed Nov. 4, 2014. Applicants claim the benefits of 35 U.S.C. § 120 as to the PCT application and priority under 35 U.S.C. § 119 as to the said Indian application, and the entire disclosures of both applications are incorporated herein by reference in their entireties.

TECHNICAL FIELD

The present subject matter described herein, in general, relates to drip irrigation, and more particularly to a sprinkler configured to control flow rate.

BACKGROUND

Sprinklers embedded with generator are used to harvest energy from flowing water. These sprinklers with generator are configured to precisely control rotation and the radius of distribution. The flow rates can control the rotational speed of the sprinkler and compensate up to 25%. The flow rate is compensated by creating cavities in the system at higher speed of sprinkler rotation.

However, at higher flow rate the area covered or the radius of coverage for the sprinkler reduces. Thus requiring re-calibration of the distance between different sprinklers in a centre pivot system for optimization. The optimization enables desired distribution of the water and nutrients for the soil.

SUMMARY

This summary is provided to introduce aspects related to a sprinkler system and the aspects are further described below in the detailed description. This summary is not intended to identify essential features of the claimed subject matter nor is it intended for use in determining or limiting the scope of the claimed subject matter.

In one implementation a sprinkler system is disclosed. The system may comprise a gate valve. Further, a sprinkler frame may be mounted on the gate valve. The sprinkler frame may also consist of wires for connection. The system may further comprise of a generator. The generator may be mechanically coupled with a rotor and a generator base. Further the system may comprise of an electronic component. The system may further be housed in a sprinkler housing.

In another implementation, a flow control method is disclosed. The flow control method may comprise of adjusting flow rate of fluid using a gate valve. The method may further comprise detection of change in the flow rate. Further, generating proportionate electromotive force and applying the electromotive force on a generator to maintain desired rotation rate for a sprinkler.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present subject matter discloses a sprinkler system configured to control flow rate, and simultaneously maintaining optimized distribution of the nutrients along with fluid.

The present subject matter discloses a sprinkler system. The sprinkler system of the present disclosure may be configured to convert hydraulic energy to electrical energy by a rotor coupled to a generator. The energy maybe then stored in a battery on a board. Further, a computational board control may control rotation time of the sprinkler and also communicate to the gate valve mechanism the appropriate flow rate through connecting wire. The flow rate may be communicated to through a wireless sensor network on the board.

According to another embodiment of present subject matter discloses a sprinkler system configured to generate energy from fluid flowing through the system. The energy generated or harvested maybe applied to a gate valve. The gate valve may be positioned upstream or before a rotor. The gate valve may be configured to adjust flow rate of the fluid as required. Further, adjustment made to the flow rate can be detected by a sensor embedded in an electronic component. The detection of adjusted flow rate enables the sprinkler to further adjust the rotation using a set of instructions. The change in rotation may further generate a proportionate electromotive force on a generator.

Figure 1:
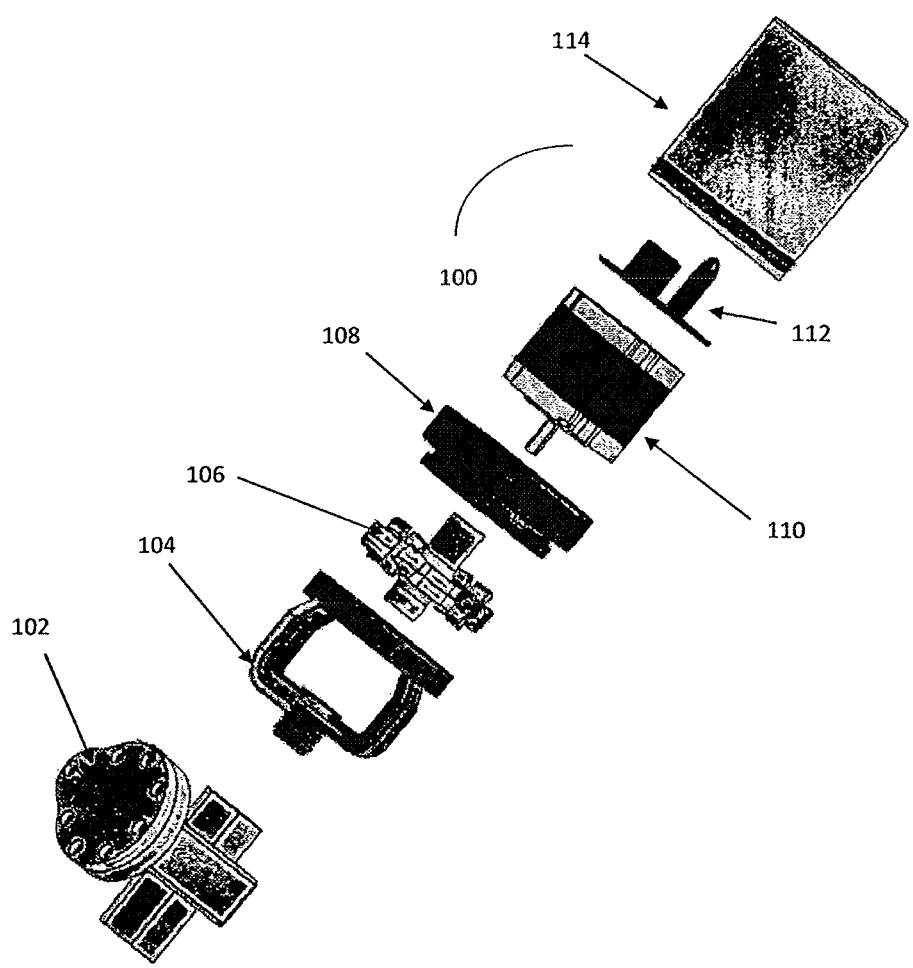
FIG. 1 illustrates a perspective view of an emitter, in accordance with an embodiment of the present subject matter.

Referring to FIG. 1, a perspective view of a sprinkler 100, in accordance with an embodiment of the present subject matter. The sprinkler 100 may comprise a gate valve 102. Further, the sprinkler 100 may comprise a sprinkler frame 104, mounted on the gate valve 102. The sprinkler frame 104 may comprise a plurality of connecting wires. A rotor 106 may be mounted on the sprinkler frame 104. The rotor 106, may be configured to be mechanically coupled to a generator 110, wherein a generator base 108 may be sandwiched between the rotor 106 and the generator 110.

The sprinkler 100 may further comprise of an electronic component 112. The electronic component may further comprise of an embedded sensor, a memory module with pre-defined set of instructions and a means for communication.

According an exemplary embodiment the sprinkler 100 can be housed in a housing 114.

Figure 2:
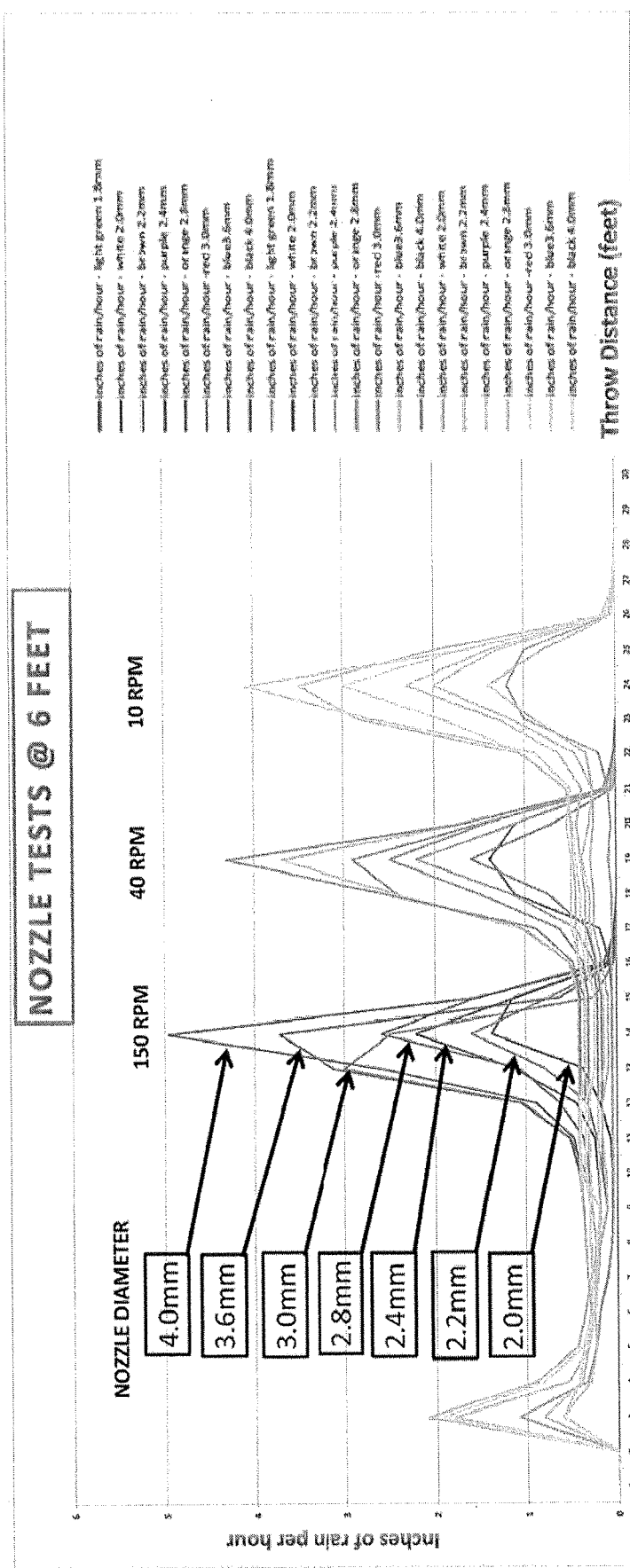
FIG. 2 illustrates a full length "6 inch deluxe TT 17×15 complete 3 up" flow model in accordance with an embodiment of the present subject matter.

FIG. 2 illustrates a graph showing flow rates achieved for various diameters by a sprinkler according to an embodiment of the present disclosure.

Figure 3:
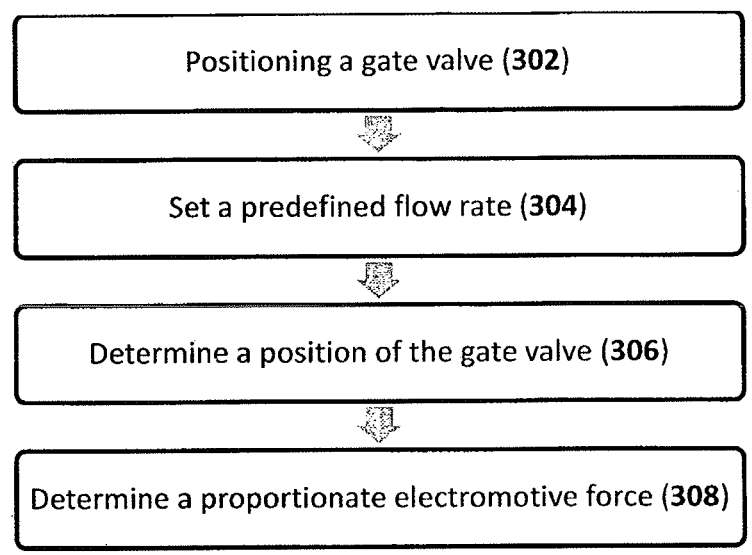
FIG. 3 illustrates a flow chart in accordance with the present subject matter.

FIG. 3 illustrates a flow chart in accordance with the present subject matter. The flow chart illustrates a method to control diameter and flow for various flow rates. As step 302 a gate valve is positioned upstream from a rotor. Further at Step 304 a predefined flow rate for the gate valve may be set. At Step a position of the gate valve may be determined based on the pre-defined flow rate. The position of the gate valve may be sensed using at least one sensor. The at least one sensor may sense the flow rate and may be mounted upstream of the gate valve.

Further at step 308 a proportionate electromotive force may be applied on a generator based on the position of the gate valve.

We claim:

1. A sprinkler system, comprising:
   a gate valve set for a predefined flow rate;
   a sprinkler frame mounted detachably on the gate valve;
   a rotor mounted on the sprinkler frame and positioned downstream from the gate valve, wherein the rotor is mechanically coupled to a generator and the generator is further configured to receive a proportionate electromotive force based on the gate valve; and
   an electronic component positioned downstream from the rotor.

2. The sprinkler system of claim 1 further comprising a generator base configured to accommodate the generator.

3. The sprinkler system of claim 2, wherein the generator base is sandwiched within between the rotor and the generator.

4. The sprinkler system of 1, wherein the electronic component further comprises at least one of a sensor, a memory module, or a means for communication.

5. The sprinkler system of claim 1, wherein the sprinkler frame further comprises a plurality of connecting wires embedded into the sprinkler frame.

* * * * *